US011518529B2

(12) United States Patent
Lee et al.

(10) Patent No.: US 11,518,529 B2
(45) Date of Patent: Dec. 6, 2022

(54) AIR MOBILITY

(71) Applicants: Hyundai Motor Company, Seoul (KR); Kia Corporation, Seoul (KR)

(72) Inventors: Sang Heon Lee, Seoul (KR); Dong Eun Cha, Hwaseong-Si (KR); Jin Ho Hwang, Cheonan-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 41 days.

(21) Appl. No.: 17/375,436

(22) Filed: Jul. 14, 2021

(65) Prior Publication Data
US 2022/0185488 A1 Jun. 16, 2022

(30) Foreign Application Priority Data
Dec. 10, 2020 (KR) .................. 10-2020-0172439

(51) Int. Cl.
*B64D 25/10* (2006.01)
*B64D 11/06* (2006.01)

(52) U.S. Cl.
CPC .......... *B64D 25/10* (2013.01); *B64D 11/0616* (2014.12); *B64D 2201/00* (2013.01)

(58) Field of Classification Search
CPC . B64D 25/10; B64D 11/0616; B64D 2201/00
See application file for complete search history.

(56) References Cited

U.S. PATENT DOCUMENTS

| 5,979,829 A | * | 11/1999 | Nance ................ | B64D 25/10 244/141 |
| 6,682,017 B1 | * | 1/2004 | Giannakopoulos .... | B64D 25/12 244/140 |
| 2009/0212160 A1 | * | 8/2009 | Beauchamp ........... | B64D 25/10 244/122 AG |
| 2020/0130852 A1 | | 4/2020 | Marutzky et al. | |

FOREIGN PATENT DOCUMENTS

| JP | 2908824 | 4/1999 | |
| KR | 20 0183909 Y1 | 3/2000 | |
| KR | 101567823 B1 | * 11/2015 | |
| KR | 10 1901581 | 9/2018 | |
| WO | WO-2018190744 A1 | * 10/2018 | ............. B64D 25/00 |

* cited by examiner

*Primary Examiner* — Richard G Davis
(74) *Attorney, Agent, or Firm* — Morgan, Lewis & Bockius LLP

(57) ABSTRACT

An air mobility may include a seat in which an airbag or a parachute is stored; and an escape portion configured to support the seat mounted to the escape portion, coupled to the air mobility to form part of the air mobility, and configured to enable a passenger to perform an emergency bailout with the seat to an outside of the air mobility when the escape portion is separated from the air mobility.

14 Claims, 4 Drawing Sheets

AIR MOBILITY

CROSS REFERENCE TO RELATED APPLICATION

The present application claims priority to Korean Patent Application No. 10-2020-0172439, filed Dec. 10, 2020, the entire contents of which is incorporated herein for all purposes by this reference.

BACKGROUND OF THE INVENTION

Field of the Invention

The present invention relates to an air mobility, and more particularly, to an air mobility configured for facilitating a passenger accommodated on a seat from the air mobility to escape in an emergency situation by having an escape portion to which a lower end portion of the seat is mounted, wherein the escape portion is coupled to the air mobility to form the floor of the air mobility.

Description of Related Art

Generally, various types of ground or air mobility industries have rapidly developed. When an emergency situation such as an accident occurs in a ground or air mobility, a safety device that enables a passenger to safely escape from the mobility is essentially required in the mobility.

The ground mobility is located on the ground when an emergency situation occurs, so it is relatively easy for the passenger on board to escape from the ground mobility. However, the air mobility moves in the air, so when the passenger cannot safely escape from the air mobility and land on the ground during an emergency situation, extreme injury may be caused.

Accordingly, it is necessary to develop technology that enables a passenger to rapidly escape from the air mobility and safely land on the ground in an emergency situation in the air mobility.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an air mobility configured to have an escape portion to which a lower end portion of a seat is mounted, wherein the escape portion is coupled to the air mobility to form the floor of the air mobility, so that a passenger accommodated on the seat can escape rapidly from the air mobility in an emergency situation as the escape portion is separated from the floor of the air mobility and falls downwardly from the air mobility.

In various aspects of the present invention, there is provided an air mobility, the air mobility including: a seat in which an airbag or a parachute is stored; and an escape portion configured to support the seat mounted to the escape portion, coupled to the air mobility to form a portion of the air mobility, and configured to enable a passenger to perform an emergency bailout with the seat to an outside of the air mobility when the escape portion is separated from the air mobility.

The escape portion may form part of a floor of the air mobility, and be configured to escape downwardly from the air mobility when the escape portion is separated from the floor.

The seat may be configured to fall downwardly from the air mobility with the escape portion while being coupled to the escape portion during the emergency bailout, and be configured such that the airbag or the parachute stored therein may be operated during falling.

The escape portion may have a coupling groove on a side surface thereof, wherein a coupling protrusion provided in the floor may protrude toward the escape portion and the protruding coupling protrusion of the floor may be inserted into the coupling groove of the escape portion, coupling the escape portion to the air mobility.

The coupling protrusion may be provided in an internal space of the floor, wherein the escape portion may be separated from the floor as the coupling protrusion of the floor inserted into the coupling groove of the escape portion is retracted into the internal space of the floor.

The escape portion may include a plurality of boosting portions, wherein each of the boosting portions may be disposed to face an upper side of the escape portion and be configured to boost the escape portion downward during the emergency bailout, so that the escape portion may be separated from the air mobility.

The plurality of boosting portions may be configured such that output power of each of the boosting portions may be controlled after the emergency bailout and each of the boosting portions may change a seat position of the seat mounted to the escape portion.

A battery may be received in the escape portion, and be configured to supply power to the air mobility, the escape portion, or the seat.

The seat may include an escape preparation portion, wherein the escape preparation portion may be configured such that, during the emergency bailout, the escape preparation portion may change a seat position to an escape position and inform the passenger of information related to wearing a seat belt or information related to the emergency bailout.

The escape preparation portion may be configured to inform the passenger of information related to operating a pilot chute of the parachute when a main chute of the parachute is not operated after the emergency bailout.

The seat may include a location transmitting portion, wherein the location transmitting portion may be configured to send location information related to the seat to a control station on the ground during or after the emergency bailout.

The escape portion may include a plurality of escape portions, wherein the plurality of escape portions may be configured such that each of the escape portions may be independently separated from the air mobility during the emergency bailout.

According to the air mobility of present invention, the escape portion to which the lower end portion of the seat is mounted is provided in the air mobility, is coupled to the air mobility to form portion of floor, and is separated from the floor of the air mobility and falls downwardly from the air mobility during an emergency situation. Accordingly, a passenger accommodated in the seat can escape rapidly from the air mobility.

The methods and apparatuses of the present invention have other features and advantages which will be apparent from or are set forth in more detail in the accompanying drawings, which are incorporated herein, and the following

Figure 1A:
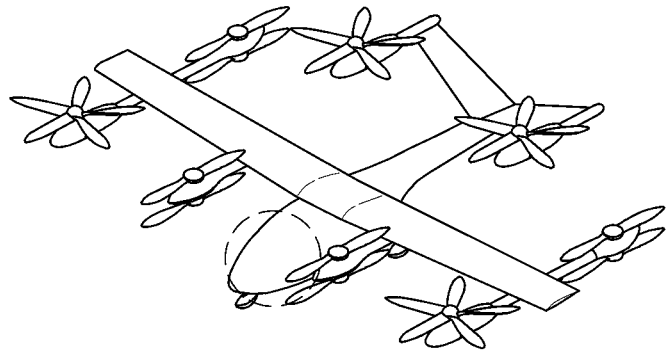
FIG. 1A, FIG. 1B AND FIG. 1C are views showing an air mobility according to various exemplary embodiments of the present invention, the view showing an example of an emergency bailout of an escape portion with a seat.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 1B:
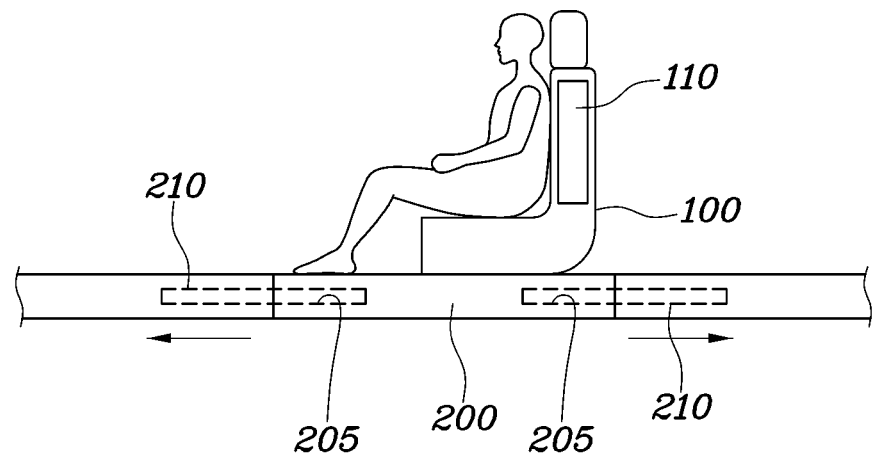
Figure 1C:
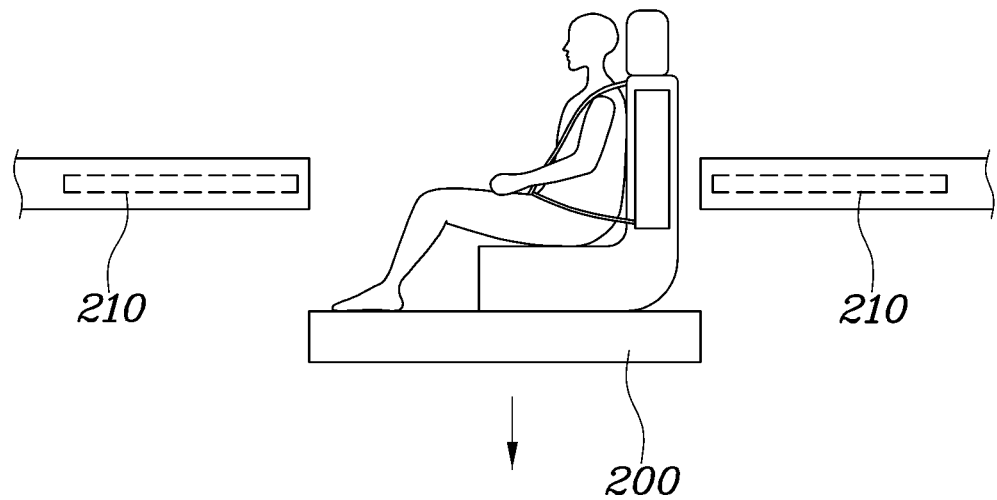
Figure 2:
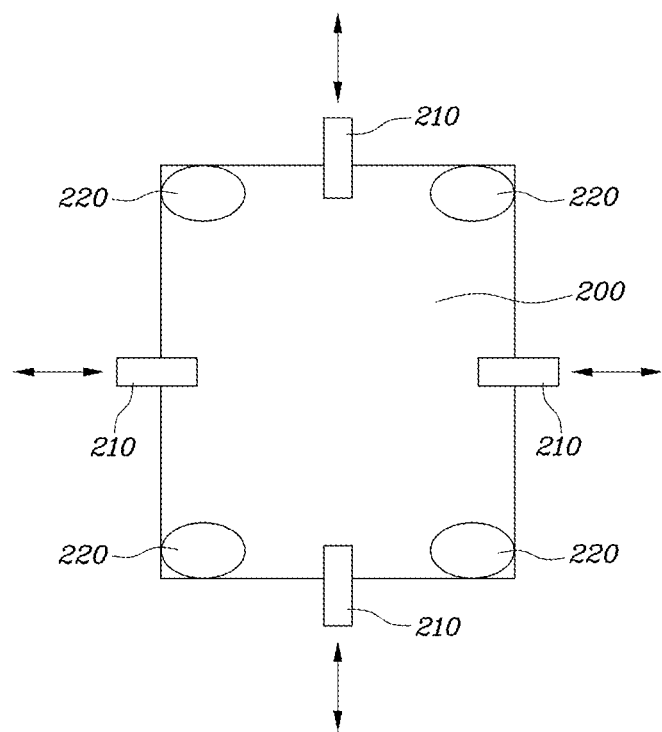
FIG. 2 is a plan view showing the escape portion of the air mobility according to the exemplary embodiment of the present invention.
Figure 3:
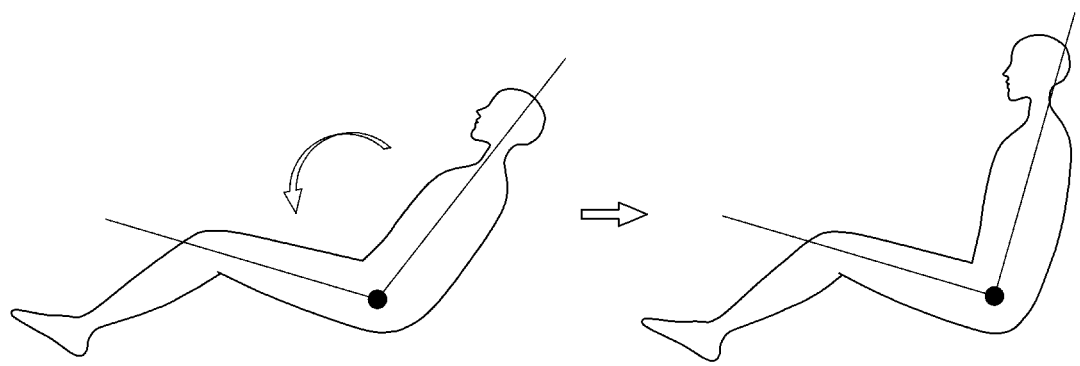
FIG. 3 is a view showing change of a seat position during the emergency bailout in the air mobility according to the exemplary embodiment of the present invention.
Figure 4:
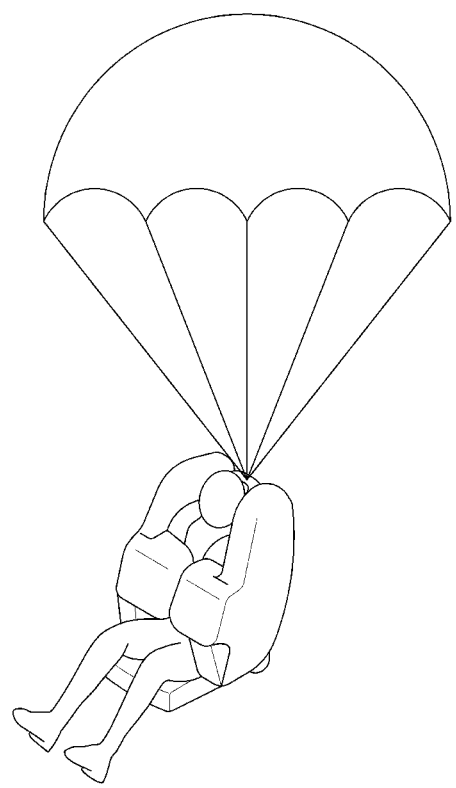
FIG. 4 is a view showing operated airbag and parachute stored in the seat after the emergency bailout in the air mobility according to the exemplary embodiment of the present invention.
Figure 5:
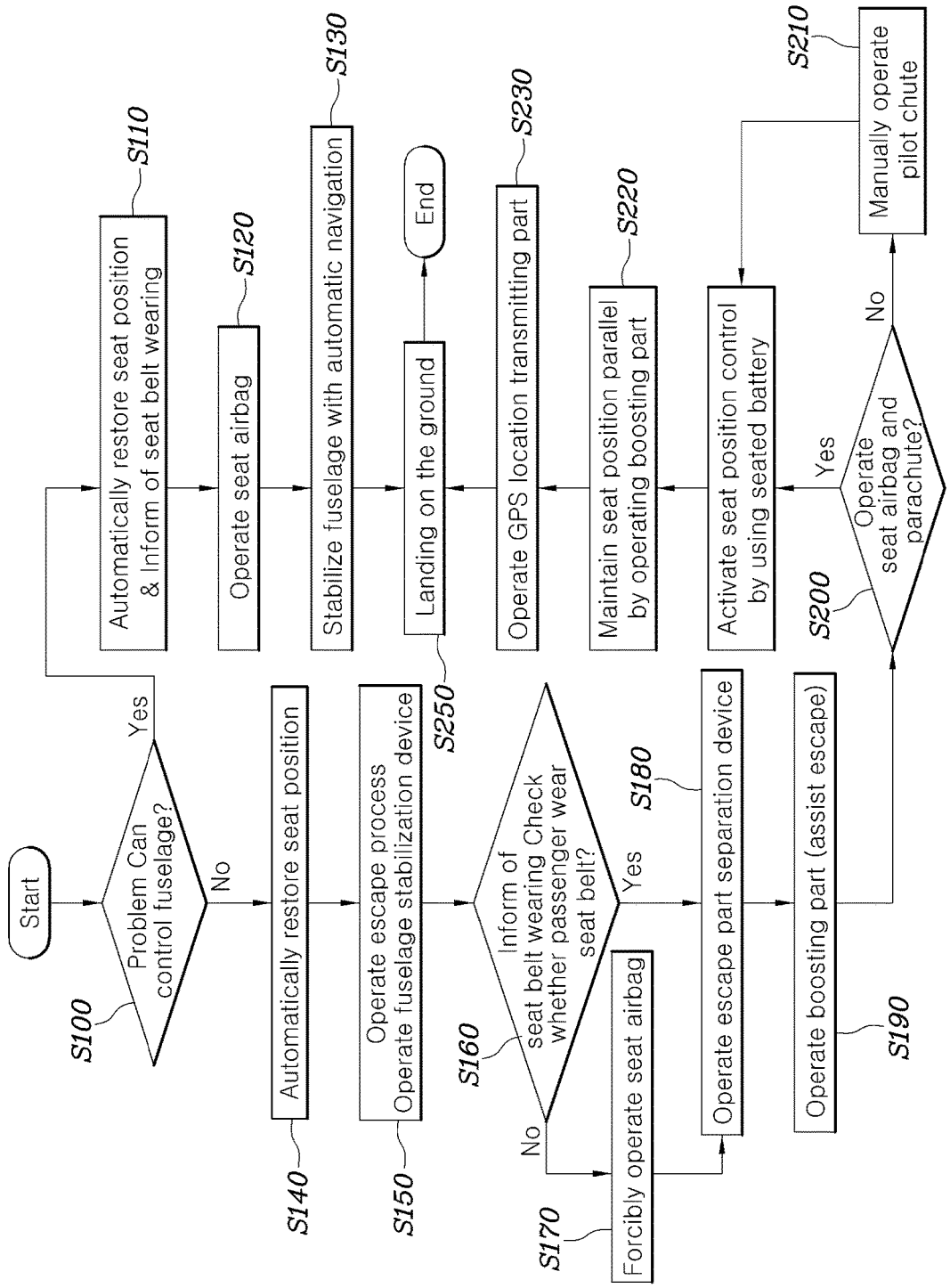
FIG. 5 is a flowchart showing an emergency bailout scenario of the air mobility according to the exemplary embodiment of the present invention.

FIG. 1A, FIG. 1B AND FIG. 1C are views showing an air mobility according to various exemplary embodiments of the present invention, the view showing an example of an emergency bailout of an escape portion with a seat. FIG. 2 is a plan view showing the escape portion of the air mobility according to the exemplary embodiment of the present invention. FIG. 3 is a view showing change of a seat position during the emergency bailout in the air mobility according to the exemplary embodiment of the present invention. FIG. 4 is a view showing operated airbag and parachute stored in the seat after the emergency bailout in the air mobility according to the exemplary embodiment of the present invention. FIG. 5 is a flowchart showing an emergency bailout scenario of the air mobility according to the exemplary embodiment of the present invention.

FIG. 1A, FIG. 1B AND FIG. 1C are the views showing the air mobility according to the exemplary embodiment of the present invention, the view showing an example of an emergency bailout of the escape portion with the seat. FIG. 2 is the plan view showing the escape portion of the air mobility according to the exemplary embodiment of the present invention. According to the exemplary embodiment of the present invention, the air mobility includes: the seat 100 in which an airbag or a parachute is stored; and the escape portion 200 configured to support the seat 100 as the seat 100 is mounted thereto, coupled to the air mobility to form part of the air mobility, and configured to enable a passenger to perform an emergency bailout with the seat 100 to the outside of the air mobility when the escape portion 200 is separated from the air mobility.

The escape portion 200 forms part of the floor of the air mobility. When the escape portion 200 is separated from the floor, the passenger can perform the emergency bailout with the escape portion 200 and the seat 100 in a lower direction of the air mobility. While the seat 100 is coupled to the escape portion 200 during the emergency bailout, the seat 100 falls with the escape portion 200 in the lower direction of the air mobility, and the airbag or the parachute stored in the seat 100 may be operated during falling. The escape portion 200 forms part of an external wall or the floor of the air mobility, and may be separated from the external wall or the floor thereof for the emergency bailout.

The air mobility according to the exemplary embodiment of the present invention is directed to secure safety of the passenger by escaping the passenger from the air mobility when flight is not possible due to a problem with an air mobility or an accident while flying in the sky. When the air mobility has a problem and is controlled to be safely landed on the ground, the passenger on the air mobility can wear a seat belt and operate the airbag in the seat 100 to keep safety during landing. However, when control of the air mobility is impossible, and when the passenger cannot escape from the air mobility in the sky and cannot safety land on the ground, extreme injury may be caused.

Therefore, in the exemplary embodiment of the present invention, when the air mobility is in an emergency situation during flight, the escape portion 200 forming portion of the floor of the air mobility is separated from the floor and escapes with the seat 100 in the lower direction of the air mobility. After escape, as the airbag and the parachute stored in an internal space 110 of the seat 100 are operated, the passenger can safely land on the ground while being accommodated in the seat 100.

Meanwhile, according to the exemplary embodiment of the present invention, the escape portion 200 of the air mobility has a coupling groove 205 provided in a side surface thereof. As a coupling protrusion 210 provided in the floor protrudes toward the escape portion 200 and the protruding coupling protrusion 210 is inserted into the coupling groove 205, the escape portion 200 may be coupled to the air mobility. The coupling protrusion 210 is provided in an internal space of the floor, and the escape portion 200 may be separated from the floor as the coupling protrusion 210 inserted into the coupling groove 205 is retracted into the internal space of the floor.

The escape portion 200 is normally coupled to the floor as portion of the floor, as the coupling protrusion 210 provided in the internal space of the floor and including a rigid rod, etc. is inserted into an internal space of the escape portion 200. However, in an emergency situation, the protruding coupling protrusion 210 is retracted into the internal space of the floor, so that coupling between the escape portion 200 and the floor is released, whereby the escape portion 200 is separated from the floor, and the emergency bailout may be possible outwardly from the air mobility. The coupling groove may include a plurality of coupling grooves formed on front-rear-left-right side walls of the escape portion 200, and the coupling protrusion 210 includes a plurality of coupling protrusions 210 in a response to the plurality of coupling grooves and is inserted into each coupling groove, so that the escape portion 200 may be rigidly fixed to the floor.

In an exemplary embodiment of the present invention, the escape portion 200 may be operated by electromagnetic force.

Furthermore, according to the exemplary embodiment of the present invention, the escape portion 200 of the air mobility includes a plurality of boosting portions 220. Each of the boosting portions 220 is disposed to face an upper side of the escape portion 200, and is configured to boost the escape portion 200 downwardly during the emergency bailout so that the escape portion 200 may escape from the air mobility. The plurality of boosting portions 220 may be disposed for each vertex of the escape portion 200, and may be configured to boost the escape portion 200 separated from the air mobility so that the escape portion 200 rapidly escapes away from the air mobility. Accordingly, it is possible to prevent explosion of the air mobility or injuries of the passenger due to a propeller of the air mobility.

FIG. 3 is a view showing change of a seat position during an emergency bailout in the air mobility according to the exemplary embodiment of the present invention. In the air mobility according to the exemplary embodiment of the present invention, the plurality of boosting portions 220 is configured such that output power of each of the boosting portions 220 is controlled by a controller after the emergency bailout and the seat position of the seat 100 mounted to the escape portion 200 may be changed by each of the boosting portions 220.

As an example, in the seat 100 in which the passenger is accommodated, when a seat position is continuously changed or rotated while the passenger is accommodated in the seat 100 during the emergency bailout, the passenger panics and the safety of the passenger on landing may not be secured. Accordingly, the seat 100 detects the seat position thereof by a sensor such as a gyro sensor (G-sensor). When the seat position of the seat 100 is changed during the emergency bailout, output power of each boosting portion 220 provided in the escape portion 200 is controlled by the controller, so that a seat position allowing the passenger to safely land on the ground is maintained as shown in the seat position of the right side in FIG. 3.

The seat 100 is configured to detect a seat position by the G-sensor after the escape of the escape portion 200 until the parachute is operated. Each of the boosting portions 220 may be configured for an air gun device using compressed air, a motor, etc. The boosting portions 220 may be configured to maintain a horizontality of the seat 100 by operating only the air gun in a position where the posture recovery of the seat position is necessary, so that the passenger can safely land. A battery provided in the escape portion 200 may be used as a motor driving power of the boosting portion 220.

In the air mobility according to the exemplary embodiment of the present invention, the battery is received in the escape portion 200, and may be configured to supply power to the air mobility, the escape portion 200, or the seat 100, whereby the battery of the escape portion 200 may supply power to the air mobility when the escape portion 200 is coupled to the air mobility, may supply power for inserting or retracting the coupling protrusion 210 into the coupling groove 205 or the floor, and supply power to the escape portion 200 and the seat 100 for operating the boosting portions 220 or the airbag and parachute of the seat 100 after the emergency bailout of the escape portion 200.

Furthermore, the battery of the air mobility may be provided for a plurality of escape portions 200. Thereby, when the passenger in the escape portion 200 performs the emergency bailout in an emergency situation, the weight of the air mobility may be reduced after the emergency bailout to reduce impact energy by 50% or more during an emergency landing of the air mobility, so that damage to an area around a landing point of the air mobility may be minimized. Furthermore, the air mobility is landed without portion of battery, so that damage due to battery explosion may be minimized.

FIG. 4 is a view showing operated the airbag and parachute stored in the seat after the emergency bailout in the air mobility according to the exemplary embodiment of the present invention. In the air mobility according to the exemplary embodiment of the present invention, an escape preparation portion is provided in the seat 100, the escape preparation portion is configured to change a seat position to an escape position during the emergency bailout, and to provide information related to wearing a seat belt or information related to an emergency bailout.

During the emergency bailout, the escape preparation portion changes the seat position of the seat 100 to the seat position shown in the right view in FIG. 3 to suit the emergency bailout, warns a passenger who is without wearing the seat belt, to wear the seat belt, and informs the passenger of emergency information or information related to a process of the emergency bailout by voice. Accordingly, the passenger can cooperate with the emergency bailout and land on the ground without fear.

Meanwhile, in the air mobility according to the exemplary embodiment of the present invention, the escape preparation portion may provide information related to operating the pilot chute to the passenger when the main chute of the parachute is not operated after the emergency bailout. The seat 100 is operated such that the airbag stored in the seat 100 surrounds the passenger with the escape portion 200 during the emergency bailout, and the passenger can land on the ground with safety as the parachute opens. The parachute includes the main chute and the pilot chute, and when the main chute fails to open after the emergency bailout, the escape preparation portion informs the passenger of information related to opening the pilot chute so that the passenger can manually operate the pilot chute.

Furthermore, in the air mobility according to the exemplary embodiment of the present invention, the seat 100 includes the location transmitting portion. The location transmitting portion may send a location information related to the seat to a control station on the ground during the emergency bailout or after the emergency bailout. The location transmitting portion is a Global Positioning System (GPS) transmitter and is received in the seat 100, so that a location of the passenger after the emergency bailout may be transmitted to the peripheral ground control center at predetermined time intervals or in real time. Accordingly, a rescue teams configured for rescuing the passenger can rapidly move to a passenger's landing point and rescue the passenger.

Meanwhile, a plurality of escape portions 200 may be provided in the air mobility according to the exemplary embodiment of the present invention, and each of the escape portions 200 may be independently separated from the air mobility during the emergency bailout. Each of the escape portions 200 may be coupled to each seat 100, and each passenger may be accommodated in each seat 100. When an emergency situation such as a defect or an accident occurs in the air mobility, all passengers can collectively escape from the air mobility through the escape portion 200, but when the time for informing the passenger of the information related to the emergency bailout is required or when the air mobility passes through an area where the emergency bailout is not possible, escape urgency may vary for each seat 100. Accordingly, the escape portions 200 need to get respective escape priorities and to be independently separated from the floor and escape from the air mobility.

Furthermore, one of the escape portions 200 located close to a point where a defect or accident occurs in the air mobility requires to immediately escape from the air mobility. Another escape portion 200 located relatively far from the defect or accident point may be configured to escape from the air mobility after informing the passenger of an emergency situation or sufficiently preparing the passenger for the emergency bailout. Furthermore, the plurality of escape portions 200 may be configured to escape from the air mobility sequentially from a near escape portion 200 to a far escape portion 200 at the defect or accident point.

FIG. 5 is a flowchart showing an emergency bailout scenario of the air mobility according to the exemplary embodiment of the present invention. When a problem such as a defect occurs in the air mobility, it is determined whether a fuselage of the air mobility in the problem is controlled S100. If the control of the fuselage of the air mobility is possible, the seat position is safely restored and the passenger is informed to wear the seat belt S110. Accordingly, the seat airbag is operated S120, and the fuselage of the air mobility is stabilized by automatic navigation S130 and then is safely landed on the ground S250.

If the control of the fuselage of the air mobility is impossible, the seat position is safely restored S140 and an escape process and fuselage stabilization device are operated S150. Accordingly, passengers are informed to wear seat belts and it is verified whether the passengers wear the seat belts S160. If a passenger does not wear a seat belt, the seat airbag is forcibly operated S170, but if the passenger wears the seat belt, the coupling protrusion is retracted from the coupling groove to separate the escape portion 200 from the air mobility S180. Accordingly, the boosting portion is operated S190 to rapidly separate the escape portion 200 from the fuselage of the air mobility, and after escape, the seat airbag and parachute are operated S200. If there is a problem with the operation of the seat airbag and parachute, the passenger is informed to manually operate the pilot chute S210.

If the seat airbag and parachute are normally operated, the boosting portion is operated by the battery provided in the escape portion, and the seat position is controlled by the boosting art S220. The GPS location transmitter stored in the seat is operated S240 to transmit a location of the passenger during the emergency bailout to the control station on the ground, so that the passenger who has landed on the ground S250 may be rapidly rescued.

In addition, the term related to a control device such as "controller", "control unit", "control device" or "control module", etc. refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In an exemplary embodiment of the present invention, each operation described above may be performed by a control device, and the control device may be configured by multiple control devices, or an integrated single control device.

In an exemplary embodiment of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An air mobility comprising:
    a seat in which an airbag or a parachute is stored; and an escape portion configured to support the seat mounted to the escape portion, coupled to the air mobility to form a portion of the air mobility, and configured to enable a passenger to perform an emergency bailout with the seat to an outside of the air mobility when the escape portion is separated from the air mobility.

2. The air mobility of claim 1, wherein the escape portion forms a part of a floor of the air mobility, and is configured to escape downwardly from the air mobility when the escape portion is separated from the floor.

3. The air mobility of claim 1, wherein the seat is configured to fall downwardly from the air mobility with the escape portion while being coupled to the escape portion during the emergency bailout, and is configured so that the airbag or the parachute stored in the seat is operated during falling.

4. The air mobility of claim 2,
wherein the escape portion has a coupling groove on a side surface of the escape portion, and
wherein a coupling protrusion provided in the floor selectively protrudes toward the escape portion and is inserted into the coupling groove of the escape portion, selectively coupling the escape portion to the air mobility.

5. The air mobility of claim 4,
wherein the coupling protrusion is provided in an internal space of the floor, and
wherein the escape portion is separated from the floor as the coupling protrusion of the floor inserted into the coupling groove of the escape portion is retracted into the internal space of the floor.

6. The air mobility of claim 1,
wherein the escape portion includes a plurality of boosting portions, and
wherein each of the boosting portions is disposed to face an upper side of the escape portion and is configured to boost the escape portion downward during the emergency bailout, so that the escape portion is separated from the air mobility.

7. The air mobility of claim 6, wherein output power of each of the boosting portions is controlled after the emergency bailout and each of the boosting portions changes a seat position of the seat mounted to the escape portion.

8. The air mobility of claim 1, wherein a battery is received in the escape portion, and is configured to supply power to the air mobility, the escape portion, or the seat.

9. The air mobility of claim 1,
wherein the seat includes an escape preparation portion, and
wherein during the emergency bailout, the escape preparation portion changes a position of the seat to an escape position and informs the passenger of information related to wearing a seat belt or information related to the emergency bailout.

10. The air mobility of claim 9, wherein the escape preparation portion is configured to inform the passenger of information related to operating a pilot chute of the parachute when a main chute of the parachute is not operated after the emergency bailout.

11. The air mobility of claim 1,
wherein the seat includes a location transmitting portion, and
wherein the location transmitting portion is configured to send location information related to the seat to a control station on the ground during or after the emergency bailout.

12. The air mobility of claim 1,
wherein the escape portion includes a plurality of escape portions, and
wherein each of the escape portions is independently separated from the air mobility during the emergency bailout.

13. A control method of an air mobility including a seat in which an airbag or a parachute is stored and an escape portion configured to support the seat mounted to the escape portion and having a coupling groove on a side surface of the escape portion, and a coupling protrusion provided in a floor of the air mobility, the control method comprising:
determining whether control of a fuselage in the air mobility is possible,
upon determining that the control of the fuselage of the air mobility is impossible, retracting the coupling protrusion from the coupling groove to separate the escape portion from the air mobility, and
operating a boosting portion mounted in the escape portion to separate the escape portion from the fuselage of the air mobility.

14. A non-transitory computer readable storage medium on which a program for performing the method of claim 13 is recorded.

* * * * *